(12) United States Patent
Wigard et al.

(10) Patent No.: US 8,588,701 B2
(45) Date of Patent: Nov. 19, 2013

(54) NOISE LEVEL COMMUNICATION FOR HIGH SPEED UPLINK PACKET ACCESS

(75) Inventors: Jeroen Wigard, Klarup (DK); Karri Ranta-Aho, Espoo (FI); Benoist Sebire, Beijing (CN)

(73) Assignee: Nokia Corporation, Espoo (FI)

( * ) Notice: Subject to any disclaimer, the term of this patent is extended or adjusted under 35 U.S.C. 154(b) by 1446 days.

(21) Appl. No.: 11/350,394

(22) Filed: Feb. 7, 2006

(65) Prior Publication Data

US 2006/0178112 A1 Aug. 10, 2006

Related U.S. Application Data

(60) Provisional application No. 60/651,570, filed on Feb. 9, 2005.

(51) Int. Cl.
 *H04B 17/00* (2006.01)
 *H04W 72/00* (2009.01)
 *H04B 7/00* (2006.01)
 *H04W 4/00* (2009.01)

(52) U.S. Cl.
 USPC ........ 455/67.11; 455/424; 455/450; 455/453; 455/509; 370/328; 370/329

(58) Field of Classification Search
 USPC ........... 455/63.1, 67.11, 67.13, 68, 69, 278.1, 455/296, 310, 423–425, 450, 452.1–452.2, 455/453, 509, 512–513, 517, 550.1, 561; 370/252, 294–295, 328–329, 332, 334, 370/337–338, 341, 344, 348; 374/175–176
 See application file for complete search history.

(56) References Cited

U.S. PATENT DOCUMENTS

| | | | |
|---|---|---|---|
| 7,324,821 B2 * | 1/2008 | Kwak et al. | 455/453 |
| 7,356,346 B2 * | 4/2008 | Gopalakrishnan et al. | 455/512 |
| 7,450,950 B2 * | 11/2008 | Kim et al. | 455/453 |
| 2002/0173330 A1 | 11/2002 | Kojima et al. | 455/522 |
| 2003/0125040 A1 * | 7/2003 | Walton et al. | 455/454 |
| 2004/0109424 A1 * | 6/2004 | Chheda | 370/331 |
| 2004/0165559 A1 | 8/2004 | Kwak et al. | |
| 2005/0043062 A1 * | 2/2005 | Ahn et al. | 455/560 |

FOREIGN PATENT DOCUMENTS

| | | |
|---|---|---|
| EP | 1257140 A1 | 11/2002 |
| EP | 1351424 A2 | 10/2003 |
| EP | 143791 A1 | 7/2004 |
| EP | 1437912 A1 | 7/2004 |
| JP | 2004-248300 | 9/2004 |
| JP | 2005-521360 | 7/2005 |
| RU | 2233035 C2 | 7/2004 |
| WO | WO 2004/098222 | 11/2004 |

OTHER PUBLICATIONS

The Random House College Dictionary, Jess Stein Ed., Random House, Rev. Ed. 1980, pp. 1177, (defining schedule).*

(Continued)

*Primary Examiner* — Meless Zewdu
(74) *Attorney, Agent, or Firm* — Harrington & Smith

(57) ABSTRACT

A communication flow for HSUPA is shown that allows a NodeB to measure the thermal plus background noise level ($P_{rx\_noise}$), and at the same time which also allows the RNC, according to its own (centralized) strategy, to overwrite the very same value that is then used in NodeB (de-centralized) scheduling.

20 Claims, 4 Drawing Sheets

(56) References Cited

OTHER PUBLICATIONS

3GPP TS 25.215 v5.4.0 (Jun. 2003); 3rd Generation Partnership Project; Technical Specification Group Radio Access Network: Physical layer-Measurments (FDD) (Release 5).
3GPP TS 25.433 v6.4.0 (Dec. 2004); 3rd Generation Partnership Project; Technical Specification Group Radio Access Network: UTRAN Iub interface NBAP Signaling (Release 6).
3GPP TS 25.309 v6.1.0 (Dec. 2004); 3rd Generation Partnership Project; Technical Specification Group Radio Access Network; FDD Enhanced Uplink; Overall Description; Stage 2 (Release 6).
3GPP TR 25.896 v6.0.0 (Mar. 2004); 3rd Generation Partnership Porject; Technical Specification Group Radio Access Network: Feasibility Study for Enhanced Uplink for UTRO FDD (Release 6).
Russian National Standard GOST 28806-90; "Software quality. Terms and definitions;" pp. 80-87; Jan. 1, 1992.
Patent Office of the Russian Federation; "Official Action (Enquiry) of the State Examination;" pp. 1-4; Mar. 3, 2009.
Japan Patent Office; Minoru Yamanaka; "Notice of Reasons for Rejection"; whole document; Nov. 10, 2009.
Panasonic; "Target RoT control methods for HSUPA"; 3GPP TSG RAN1 EUL conference call; Jan. 24, 2005; whole document; R1-050015.
NEC; "Radio resource management"; 3GPP TSG-RAN Working Group 2 #45bis; Jan. 10-14, 2005; whole document; R2-042466; Sophia Antipolis, France.
Vodafone Group; "Allocation and measurement of Enhanced Uplink Resources"; 3GPP TSG RAN WG1 meeting #38bis; Sep. 20-24, 2004; whole document; R1-041073; Seoul, Korea.
Samsung; "RRM for E-DCH"; 3GPP TSG RAN WG1 EUL Conference Call#2; Jan. 24, 2005; whole document; R1-050014.
LG Electronics; "Resource allocation for HSUPA"; Jan. 24, 2005; whole document; R1-050026.
Decision to Grant a Patent for an Invention, Russian Patent Office, English Translation and original Decision, Jul. 9, 2010.

\* cited by examiner

NOISE LEVEL COMMUNICATION FOR HIGH SPEED UPLINK PACKET ACCESS

CROSS-REFERENCE TO RELATED APPLICATION

This application claims priority to U.S. Provisional Patent Application 60/651,570, filed Feb. 9, 2005.

FIELD OF THE INVENTION

The field of the invention is mobile communications and, more particularly, improving link adaptation when using decentralized scheduling.

BACKGROUND OF THE INVENTION

Referring to FIG. 1, the Universal Mobile Telecommunications System (UMTS) packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network over a (wired) Iu interface.

FIG. 2 shows some further details of the architecture, particularly the UTRAN. The UTRAN includes multiple Radio Network Subsystems (RNSs), each of which contains at least one Radio Network Controller (RNC). Each RNC may be connected to multiple NodeBs which are the UMTS counterparts to GSM base stations. Each NodeB may be in radio contact with multiple UEs via the radio interface (Uu) shown in FIG. 1. A given UE may be in radio contact with multiple NodeBs even if one or more of the NodeBs are connected to different RNCs. For instance a UEI in FIG. 2 may be in radio contact with NodeB 2 of RNS 1 and NodeB 3 of RNS 2 where NodeB 2 and NodeB 3 are neighboring NodeBs. The RNCs of different RNSs may be connected by an Iur interface which allows mobile UEs to stay in contact with both RNCs while traversing from a cell belonging to a NodeB of one RNC to a cell belonging to a NodeB of another RNC. One of the RNCs will act as the "serving" or "controlling" RNC (SRNC or CRNC) while the other will act as a "drift" RNC (DRNC). A chain of such drift RNCs can even be established to extend from a given SRNC. The multiple NodeBs will typically be neighboring NodeBs in the sense that each will be in control of neighboring cells. The mobile UEs are able to traverse the neighboring cells without having to re-establish a connection with a new NodeB because either the NodeBs are connected to a same RNC or, if they are connected to different RNCs, the RNCs are connected to each other. During such movements of a UE, it is sometimes required that radio links be added and abandoned so that the UE can always maintain at least one radio link to the UTRAN. This is called soft-handover (SHO).

The invention relates to the 3GPP (Third Generation Partnership Project) specification of the Universal Mobile Telecommunications System (UMTS) Terrestrial Radio Access (UTRA) and more specifically to the Wideband Code Division Multiple Access (WCDMA) High Speed Uplink Packet Access (HSUPA) which is an enhanced uplink feature used in the Frequency Division Duplex (FDD) mode. This feature is being specified in the 3GPP and targeted to 3GPP release 6.

In the current architecture, the packet scheduler is located in the RNC and therefore is limited in its ability to adapt to the instantaneous traffic, because of bandwidth constraints on the Radio Resource Control (RRC) layer signalling interface between the RNC and the UE. Hence, to accommodate the variability, the packet scheduler must be conservative in allocating uplink power to take into account the influence from inactive users in the following scheduling period—a solution which turns out to be spectrally inefficient for high allocated data-rates and long release timer values.

With the introduction of HSUPA some of the the packet scheduler functionality is moved from the RNC to the NodeB. Due to the decentralization, the possibility arises to more quickly react to overload situations, enabling much more aggressive scheduling, e.g., by faster modifications of the bit rates, which will give a higher cell capacity. HSUPA and the fast NodeB controlled scheduling are also supported in soft handover.

According to Section 7.1 of the Technical Report 3GPP TR 25.896 v6.0.0 (2004-03) entitled "Feasibility Study for Enhanced Uplink for UTRA FDD (Release 6)," the term "NodeB scheduling" denotes the possibility for the NodeB to control, within the limits set by the RNC, the set of Transport Format Combinations (TFCs) from which the UE may choose a suitable TFC. In the context of HSUPA, the transport format combinations (E-TFCs) of the transport channel subject to the Node B scheduling (E-DCH) are controlled by the Node B which can grant the UE with the maximum amount of uplink resources the given UE is allowed to use. An E-TFC (E-DCH Transport Format Combination) is the combination of currently valid Transport Format for the E-DCH with the applicable maximum number of H-ARQ retransmissions and applied transmission power offset. (see 3G TS 25.309 for related definitions and in-depth explanations). In Release 5, the uplink scheduling and rate control resides in the RNC. According further to the TR 25.896 study report, by providing the NodeB with this capability, tighter control of the uplink interference is possible which, in turn, may result in increased capacity and improved coverage. The TR 25.896 report discusses two fundamental approaches to scheduling: (1) rate scheduling, where all uplink transmissions occur in parallel but at a low enough rate such that the desired noise rise at the NodeB is not exceeded, and (2) time scheduling, where theoretically only a subset of the UEs that have traffic to send are allowed to transmit at a given time, again such that the desired total noise rise at the NodeB is not exceeded. The HSUPA feature specified is expected to enable both scheduling approaches.

The present invention is related to these HSUPA enhancements of the uplink DCH (hereafter referred to as EDCH) for packet data traffic in release 6 of 3GPP as specified in the above mentioned 3GPP TR 25.896, "Feasibility Study for Enhanced Uplink for UTRA FDD" as well as in the 3GPP specification TS 25.309, "FDD Enhanced Uplink—Overall description—Stage 2," Version 6.1.0 (2004-12). As suggested above, HSUPA enhancements are currently approached by distributing some of the packet scheduler functionality to the NodeBs. This permits faster scheduling of bursty non realtime traffic than possible using the layer 3 in the Radio Network Controller (RNC). The idea is that with faster link adaptation it is possible to more efficiently share the uplink power resource between packet data users: when packets have been transmitted from one user the scheduled resource can be made available immediately to another user. This avoids the peaked variability of noise rise, when high data rates are being allocated to users running bursty high data-rate applications.

As a consequence of much of the packet scheduler functionality having been transferred to the NodeB for EDCH, the NodeB scheduler takes care of allocating uplink resources. But it is desirable for the RNC to be able to set a certain target noise rise to the NodeB. The NodeB then takes care of scheduling such that the total noise rise level, caused by DCH and EDCH, stays below or on the target level.

The target noise rise level is set relative to the thermal plus background noise ($P_{rx\_noise}$). $P_{rx\_noise}$ is therefore a reference to be used in NodeB scheduling. $P_{rx\_noise}$ can either be measured in the NodeB directly or set by the RNC via NodeB Application Part (NBAP) signalling. Background information about measurement values can be found in 3GPP TS 25.433, Version 6.4.0 (2004-12), "*UTRAN Iub Interface NBAP Signalling*," Section 9.2.1.12. Various relevant definitions can be found in 3GPP TS 25.215, Version 5.4.0 (2003-06), "*Physical Layer—Measurements (FDD)*."

SUMMARY OF THE INVENTION

Depending on the overall scheduling strategy it may be better to either measure $P_{rx\_noise}$ directly in the NodeB or let the RNC fix that value. The problem is then how to design a communication flow for HSUPA, which allows the NodeB to measure, and set the thermal plus background noise level ($P_{rx\_noise}$), and at the same time which also allows the RNC to overwrite the very same value that is used in NodeB scheduling.

In this invention a communication flow is proposed, which allows NodeB scheduling to either use the $P_{rx\_noise}$ measured in the NodeB or the $P_{rx\_noise}$ signaled by RNC. RNC signalling $P_{rx\_noise}$ to the NodeB causes the NodeB measured quantity to be overwritten in NodeB scheduling.

It is known that the NodeB can measure the thermal plus background noise.

It is also known that the RNC can set the value, but the mechanism that the NodeB measures and the RNC can overwrite the measured value by another value is new in general and for HSUPA in particular.

There are numerous advantages of the present invention over the prior art. Those advantages include flexibility, in that the network can be set up such that the thermal plus background noise level used as a reference in NodeB scheduling can either be measured in the NodeB, or signalled by RNC. An additional advantage is the multi vendor scenario: an RNC is given means to ensure that a known reference is always used in NodeB scheduling regardless of the measurement capability of the NodeB(s).

Although the present specification discloses the invention in the context of an improvement to an HSUPA situation, it should be realized that the core concept is applicable to other situations in wireless interfaces and not limited to HSUPA and not limited to the uplink direction.

A person of ordinary skill in the art will understand that the method summarized above can also be summarized as follows, for example. At a Node B, a value of received total wide band power is measured. Then the Node B signals the value of received total wide band power in a common measurement value information element, from the Node B to a radio network controller. A Node B scheduler then uses the value of received total wide band power to make scheduling decisions, unless the Node B receives a noise value from the radio network controller in response to the signalling, in which case the Node B uses that noise value in said scheduling decisions. A person of ordinary skill in the art will also understand that the various measurements described in the present application may include estimations.

DETAILED DESCRIPTION OF THE INVENTION

Figure 1:
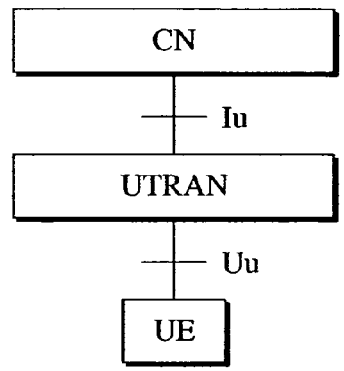
FIG. 1 shows the packet network architecture for the Universal Mobile Telecommunications System (UMTS).
Figure 2:
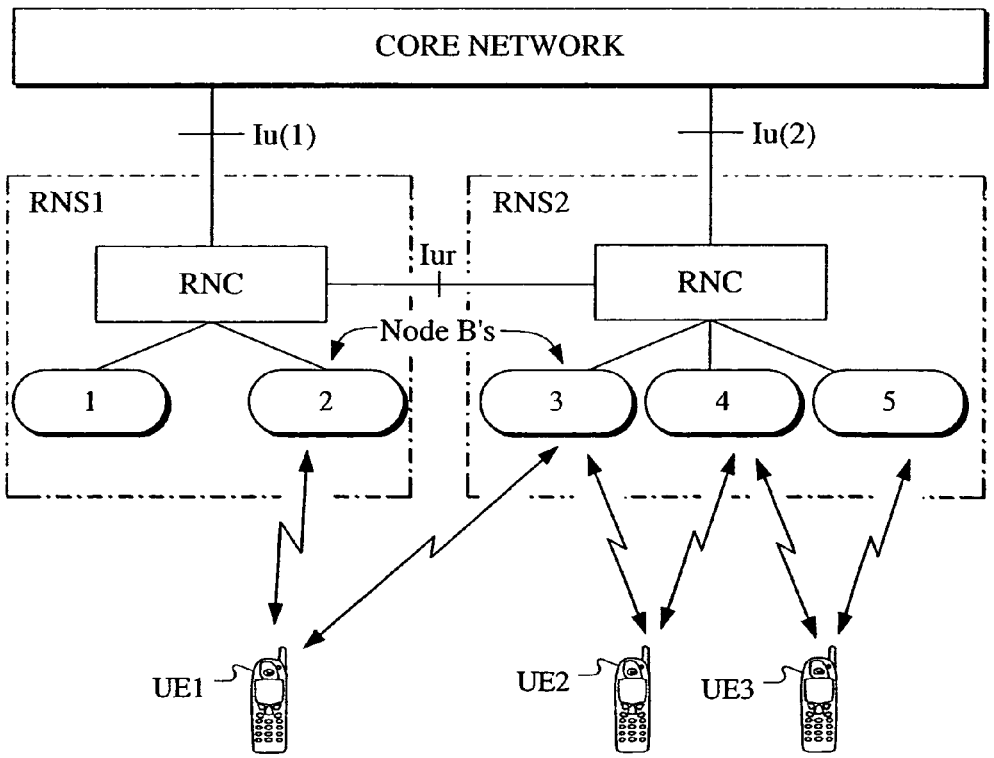
FIG. 2 shows some further details of the overall architecture of the UMTS.
Figure 3:
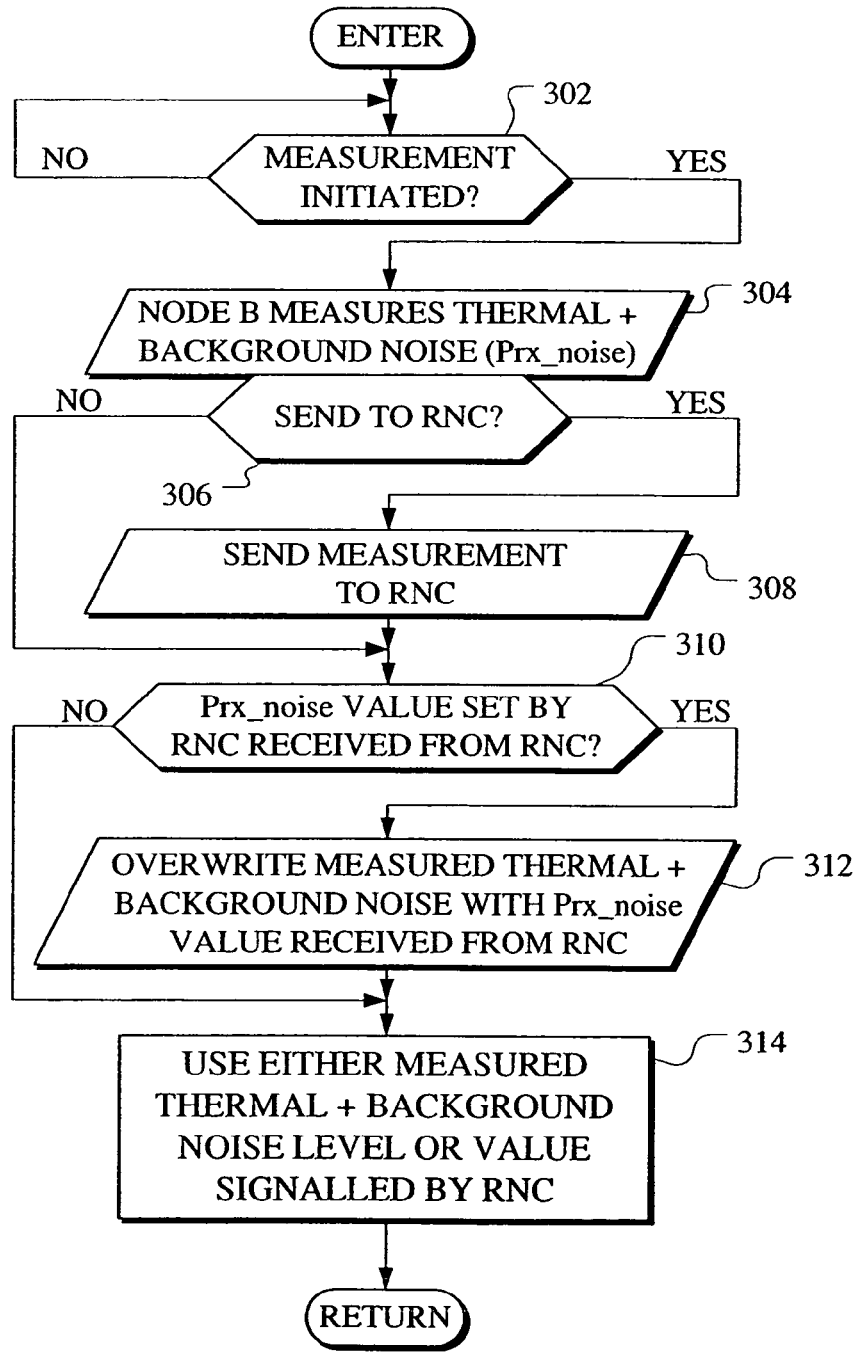
FIG. 3 is a simplified flow chart showing steps for carrying out the present invention in a NodeB.

An embodiment of the present invention is shown in FIG. 3. According to that figure, the invention proposes the following for execution in the NodeB. After determining in a step 302 that a measurement has been initiated, the NodeB measures the thermal plus background noise as shown in a step 304. The NodeB can do so on command of the RNC or based on some internal criterion.

As determined in a step 306, the NodeB may send this value to the RNC when requested or on a periodic basis. If it is determined to send the measurement, such is done in a step 308, as shown. This measurement can, for example, be a received total wide band power (RTWP), signalled via a common measurement value (CMV) information element.

The RNC can decide to provide the NodeB with a value for the thermal plus background noise level to be used as a reference for NodeB scheduling instead of the measured value. The NodeB can check if such a value has been sent as shown in a step 310.

Upon reception of a signalling message carrying the new value from RNC, the NodeB overwrites the measured value by the new one in NodeB scheduling as shown in a step 312.

The thermal plus background noise level used as reference for NodeB scheduling is either the measured value or the one signalled by RNC, as shown in a step 314.

Figure 4:
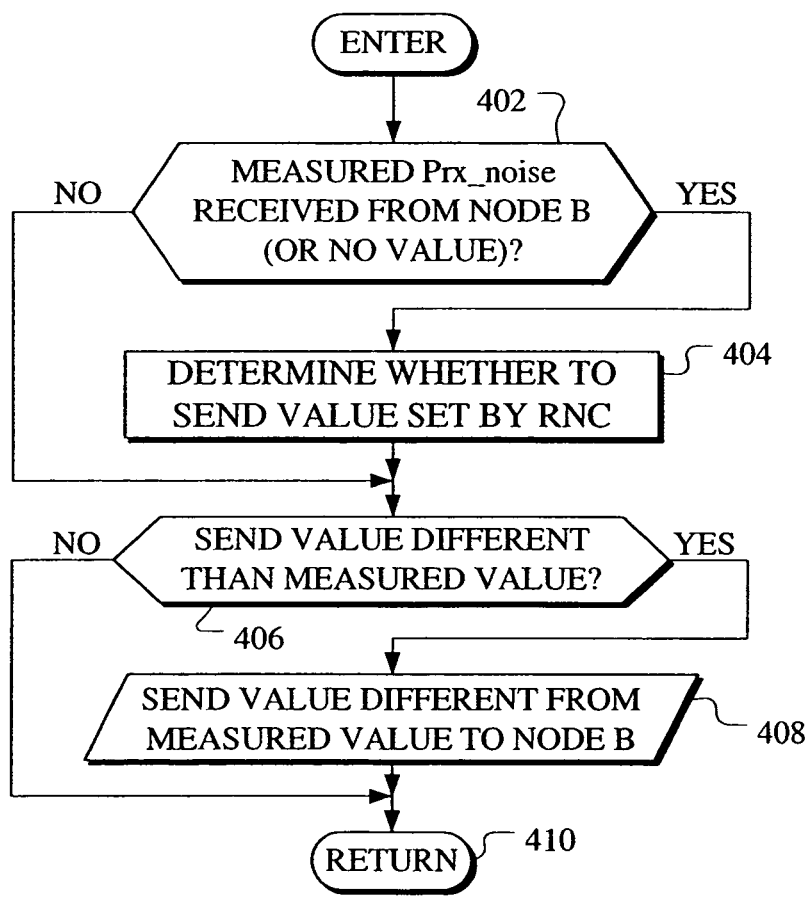
FIG. 4 is a simplified flow chart showing steps for carrying out the present invention in a Radio Network Controller (RNC).

FIG. 4 is a simplified flowchart illustrating steps carried out in a Radio Network Controller (RNC), according to the present invention. A determination is made in a step 402 if a measured $P_{rx\_noise}$ value has been received from a NodeB. If so, a step 404 is executed to determine whether the NodeB should use the measured value or a value supplied to the NodeB by the RNC. After the determination, a decision is made in a step 406 whether to send a different value $P_{rx\_noise}$ value or not. The decision in step 406 is also made if there was no measured value received from the NodeB. If a $P_{rx\_noise}$ is to be sent, such is done in a step 408, as shown. Whether or not a $P_{rx\_noise}$ is sent, a return is made in a step 410.

Figure 5:
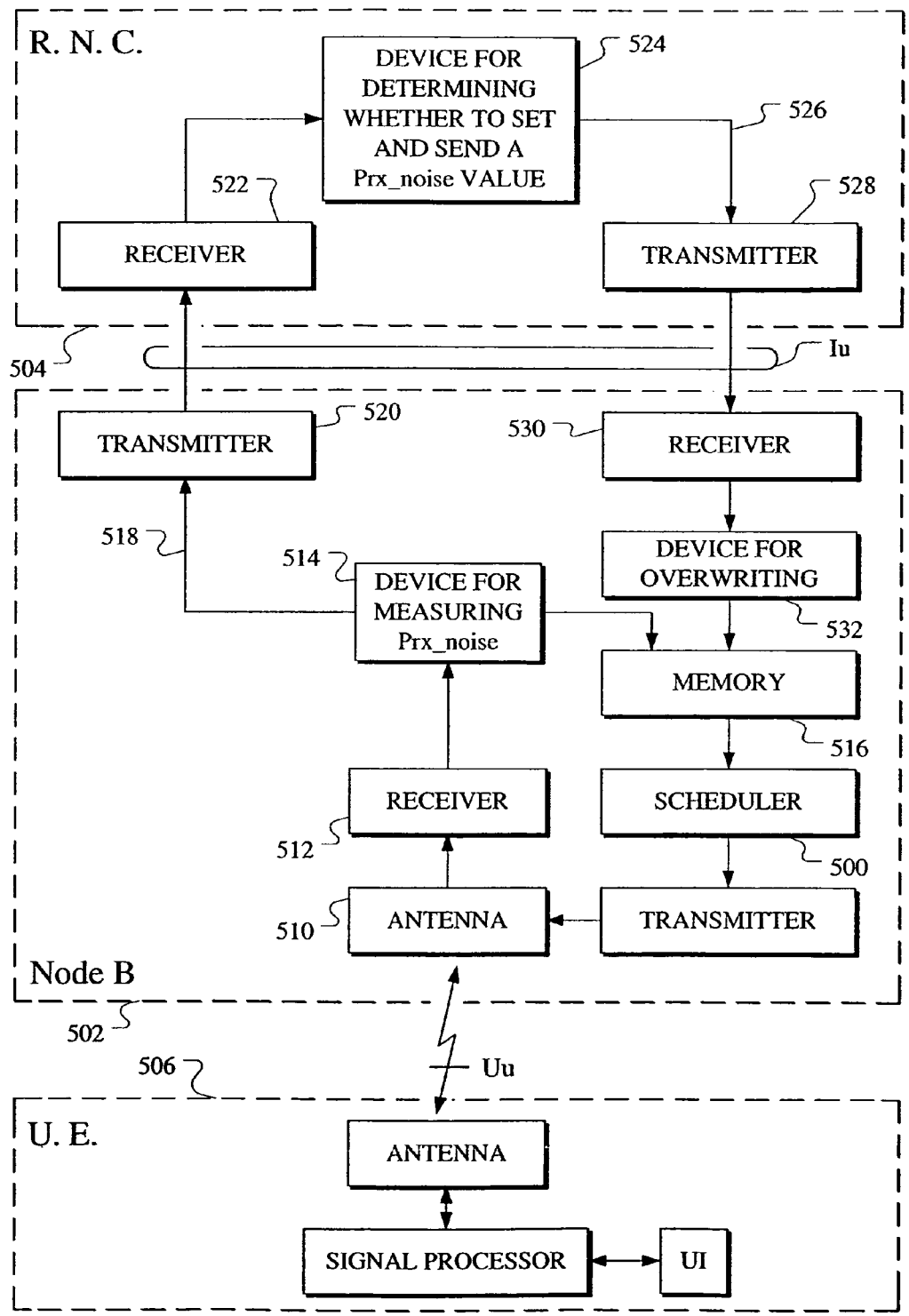
FIG. 5 illustrates a system according to the present invention.

FIG. 5 shows a system, according to the present invention. A scheduler 500 is located in a NodeB 502 to control, within the limits set by an RNC 504, the set of Transport Format Combinations (TFCs) from which a UE 506 may choose a suitable TFC. The NodeB makes measurements of the the radio interface (Uu) thermal plus background noise ($P_{rx\_noise}$) via an antenna 510, a receiver 512, and a device 514 for measuring $P_{rx\_noise}$. According to the present invention, the measured value of $P_{rx\_noise}$ is stored in a memory and may be sent as a signal on a line 518 via a transmitter to a receiver 522 of the RNC 504 where it is provided to a device 524 for determining whether to send a $P_{rx\_noise}$ value different from the measured value. Depending on the strategy employed by the RNC 504, a signal on a line 526 may be provided to a transmitter 528 which provides a $P_{rx\_noise}$ value set by the RNC to a receiver 530 of the NodeB 502. The NodeB may include a device 532 for using the $P_{rx\_noise}$ value received from the RNC to overwrite the measured value stored in the memory 516. The scheduler 500 will thus use the measured value stored by the device 514 or the $P_{rx\_noise}$ value supplied by the RNC, depending on the strategy employed by the RNC.

Although the invention has been shown and described with respect to a best mode embodiment thereof, it will be evident to those of skill in the art that various other devices and methods can be provided to carry out the objectives of the present invention while still falling within the coverage of the appended claims. It is to be understood that all of the present figures, and the accompanying narrative discussions of best mode embodiments, do not purport to be completely rigorous treatments of the invention under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method, comprising:
    making, in a first network element, a measurement indicative of a thermal plus background noise comprising both thermal and background components on a radio interface between user equipments and said first network element serving the user equipments;
    scheduling by the first network element uplink signalling for the user equipments using the measured thermal plus background noise.

2. The method of claim 1, further comprising:
    receiving by the first network element from a second network element a new noise value; and
    further scheduling by the first network element uplink signalling for the user equipments using the received new noise value and not the measured thermal plus background noise.

3. A method, comprising:
    making, in a first network element, a measurement indicative of a thermal plus background noise comprising both thermal and background components on a radio interface between user equipments and said first network element serving the user equipments;
    scheduling by the first network element uplink signalling for the user equipments using the measured thermal plus background noise,
    wherein after making the measurement of the thermal plus background noise, the method further comprises:
    sending a measurement report indicative of the measurement of the thermal plus background noise by the first network element to a second network element.

4. The method of claim 1, further comprising:
    sending a measurement report indicative of the measurement of the thermal plus background noise by the first network element to a second network element;
    receiving by the first network element from the second network element a new noise value; and
    further scheduling by the first network element uplink signalling for the user equipments using the received new noise value and not the measured thermal plus background noise.

5. The method of claim 1, further comprising:
    making, in the first network element, a further measurement indicative of a thermal plus background noise comprising both thermal and background components on the radio interface between user equipments and the first network element serving the user equipments;
    sending a measurement report indicative of the further measurement of the thermal plus background noise by the first network element to a second network element;
    receiving by the first network element from the second network element a new noise value; and
    further scheduling by the first network element uplink signalling for the user equipments using the received new noise value and not the further measured thermal plus background noise.

6. The method of claim 1, wherein the first network element comprises a Node B and a second network element comprises a radio network controller.

7. The method of claim 3, further comprising the measurement indicative of a thermal noise plus background noise is a received total wideband power measurement.

8. A method, comprising:
    receiving by a second network element from a first network element a measurement report indicative of a thermal plus background noise measured by the first network element on a radio interface between user equipments and said first network element serving the user equipments; and
    determining by the second network element based on the received measurement report indicative of the thermal plus background noise whether to set a new noise value.

9. The method of claim 8, wherein the first network element comprises a Node B and the second network element comprises a radio network controller.

10. A method, comprising:
    receiving by a second network element from a first network element a measurement report indicative of a thermal plus background noise measured by the first network element on a radio interface between user equipments and said first network element serving the user equipments; and
    determining by the second network element based on the received measurement report indicative of the thermal plus background noise whether to set a new noise value,
    further comprising:
    setting, by the second network element based on said determining, the new noise value different from the received thermal plus background noise; and
    sending the new noise value to the first network element for using the new noise value for scheduling of uplink signalling for the user equipments by the first network element.

11. An apparatus comprising:
    at least one processor and a memory storing a set of computer instructions, in which the memory and the set of computer instructions are configured to, with the at least one processor, to cause the apparatus to perform at least the following:
    make a measurement indicative of a thermal plus background noise comprising both thermal and background components on a radio interface between user equipments and a first network element serving the user equipments; and
    schedule uplink signalling for the user equipments using the measured thermal plus background noise.

12. The apparatus of claim 11, wherein the memory and the set of computer instructions are further configured to, with the at least one processor, to cause the apparatus to perform at least the following:
    receive from a second network element a new noise value; and further scheduling by the first network element uplink signalling for the user equipments using the received new noise value and not the measured thermal plus background noise.

13. The apparatus of claim 11, wherein the memory and the set of computer instructions are further configured to, with the at least one processor, to cause the apparatus to perform at least the following:
send a measurement report indicative of the measurement of the thermal plus background noise to the second network element;
receive from the second network element a new noise value; and
further schedule uplink signalling for the user equipments using the received new noise value and not the measured thermal plus background noise.

14. The apparatus of claim 11, wherein the memory and the set of computer instructions are further configured to, with the at least one processor, to cause the apparatus to perform at least the following:
make a further measurement indicative of a thermal plus background noise comprising both thermal and background noise on the radio interface between the user equipments and the first network element serving the user equipments;
send a measurement report indicative of the further measurement of the thermal plus background noise to a second network element;
receive from the second network element a new noise value; and
further schedule uplink signalling for the user equipments using the received new noise value and not the measured thermal plus background noise or the further measured thermal plus background noise.

15. The apparatus of claim 11, wherein the apparatus comprises a Node B.

16. An apparatus comprising:
at least one processor and a memory storing a set of computer instructions, in which the memory and the set of computer instructions are configured to, with the at least one processor, to cause the apparatus to perform at least the following:
make a measurement indicative of a thermal plus background noise comprising both thermal and background components on a radio interface between user equipments and a first network element serving the user equipments; and
schedule uplink signalling for the user equipments using the measured thermal plus background noise,
wherein after making the measurement of the thermal plus background noise, the memory and the set of computer instructions are further configured to, with the at least one processor, to cause the apparatus to perform at least the following:
send a measurement report indicative of the measurement of the thermal plus background noise by the apparatus to a second network element.

17. An apparatus comprising:
at least one processor and a memory storing a set of computer instructions, in which the memory and the set of computer instructions are configured to, with the at least one processor, to cause the apparatus to perform at least the following:
receive from a first network element a measurement report indicative of a thermal plus background noise measured by the first network element on a radio interface between user equipments and said first network element serving the user equipments; and
determine based on the received measurement report indicative of the thermal plus background noise whether to set a new noise value.

18. An apparatus comprising:
at least one processor and a memory storing a set of computer instructions, in which the memory and the set of computer instructions are configured to, with the at least one processor, to cause the apparatus to perform at least the following:
receive from a first network element a measurement report indicative of a thermal plus background noise measured by the first network element on a radio interface between user equipments and said first network element serving the user equipments; and
determine based on the received measurement report indicative of the thermal plus background noise whether to set a new noise value,
wherein the memory and the set of computer instructions are further configured to, with the at least one processor, to cause the apparatus to perform at least the following:
set, based on said determining, the new noise value different from the received thermal plus background noise; and
send the new noise value to the first network element to use the new noise value for scheduling of uplink signalling for the user equipments by the first network element.

19. A non-transitory computer readable medium bearing computer program code embodied therein for use with a computer, the computer program code comprising:
code for making, in a first network element, a measurement indicative of a thermal plus background noise comprising both thermal and background components on a radio interface between user equipments and said first network element serving the user equipments; and
code for scheduling by the first network element uplink signaling for the user equipments using the measured thermal plus background noise.

20. A non-transitory computer readable medium bearing computer program code embodied therein for use with a computer, the computer program code comprising:
code for receiving by a second network element from a first network element a measurement report indicative of a thermal plus background noise measured by the first network element on a radio interface between user equipments and said first network element serving the user equipments; and
code for determining by the second network element based on the received measurement report indicative of the thermal plus background noise whether to set a new noise value.

* * * * *